US012251767B2

(12) United States Patent
Wiesner et al.

(10) Patent No.: US 12,251,767 B2
(45) Date of Patent: Mar. 18, 2025

(54) METHOD FOR SEPARATING A PLURALITY OF SLICES FROM WORKPIECES BY MEANS OF A WIRE SAW DURING A SEQUENCE OF SEPARATION PROCESSES

(71) Applicant: Siltronic AG, Munich (DE)

(72) Inventors: Peter Wiesner, Reut (DE); Wolfgang Gmach, Emmerting (DE); Robert Kreuzeder, Wurmannsquick (DE)

(73) Assignee: SILTRONIC AG, Munich (DE)

( * ) Notice: Subject to any disclaimer, the term of this patent is extended or adjusted under 35 U.S.C. 154(b) by 258 days.

(21) Appl. No.: 18/009,348

(22) PCT Filed: May 20, 2021

(86) PCT No.: PCT/EP2021/063443
§ 371 (c)(1),
(2) Date: Dec. 9, 2022

(87) PCT Pub. No.: WO2021/249735
PCT Pub. Date: Dec. 16, 2021

(65) Prior Publication Data
US 2023/0234149 A1    Jul. 27, 2023

(30) Foreign Application Priority Data
Jun. 10, 2020    (EP) .................................... 20179150

(51) Int. Cl.
*B23D 57/00*    (2006.01)
*B23D 59/00*    (2006.01)
(Continued)

(52) U.S. Cl.
CPC ..... *B23D 57/0023* (2013.01); *B23D 57/0061* (2013.01); *B23D 59/002* (2013.01);
(Continued)

(58) Field of Classification Search
CPC .............. B23D 57/0023; B28D 5/0064; B28D 5/0076; B28D 5/0045
See application file for complete search history.

(56) References Cited

U.S. PATENT DOCUMENTS 5,377,568 A * 1/1995 Hauser ............... B23D 57/0046
83/651.1
5,616,065 A * 4/1997 Egglhuber ......... B23D 57/0046
125/16.02
(Continued)

FOREIGN PATENT DOCUMENTS

DE    102011005949 A1    9/2012
JP    2005103683 A    4/2005
(Continued)

*Primary Examiner* — Omar Flores Sanchez
(74) *Attorney, Agent, or Firm* — LEYDIG, VOIT & MAYER, LTD.

(57) ABSTRACT

Slices are cut from workpieces using a wire saw having a wire array tensioned in a plane between two wire guide rollers each supported between fixed and floating bearings and comprising a chamber and a shell enclosing a core and having guide grooves for wires. During a cut-off operation, a workpiece is fed through the wire array perpendicular to a workpiece axis and the wire array plane. The workpiece is fed through the wire array while simultaneously: changing shell lengths by adjusting chamber temperatures in dependence on a depth of cut and a first correction profile; and moving the workpiece along the workpiece axis in accordance with a second correction profile. The correction profiles are opposed to a shape deviation.

7 Claims, 6 Drawing Sheets

(51) Int. Cl.
    *B28D 5/00*           (2006.01)
    *B28D 5/04*           (2006.01)

(52) U.S. Cl.
    CPC ......... *B28D 5/0064* (2013.01); *B28D 5/0076* (2013.01); *B28D 5/045* (2013.01)

(56) References Cited

U.S. PATENT DOCUMENTS

| | | | | |
|---|---|---|---|---|
| 5,875,770 | A * | 3/1999 | Fukunaga | B28D 5/0082 125/16.02 |
| 6,021,772 | A * | 2/2000 | Seifert | B28D 1/127 83/100 |
| 10,562,130 | B1 * | 2/2020 | Donofrio | B28D 5/0064 |
| 2002/0174861 | A1 * | 11/2002 | Lundt | B28D 5/0064 125/21 |
| 2004/0168682 | A1 * | 9/2004 | Hammer | B28D 5/0088 125/16.01 |
| 2012/0240915 | A1 * | 9/2012 | Huber | B23D 57/0053 125/21 |
| 2012/0298091 | A1 * | 11/2012 | Hoshiyama | B24B 27/0633 125/16.02 |
| 2014/0144420 | A1 * | 5/2014 | Wiesner | B28D 1/08 125/16.02 |
| 2015/0158203 | A1 * | 6/2015 | Wiesner | B28D 5/045 125/21 |
| 2018/0141237 | A1 * | 5/2018 | Jeon | B28D 5/045 |
| 2021/0114257 | A1 * | 4/2021 | Kanbayashi | B28D 5/045 |
| 2022/0040882 | A1 * | 2/2022 | Beyer | B28D 5/0064 |
| 2022/0134600 | A1 * | 5/2022 | Zheng | B28D 7/02 125/21 |
| 2023/0050459 | A1 * | 2/2023 | Pietsch | B28D 5/0076 |
| 2023/0226629 | A1 * | 7/2023 | Beyer | B28D 5/0076 30/166.3 |
| 2023/0234261 | A1 * | 7/2023 | Beyer | B23D 59/04 83/15 |
| 2023/0286067 | A1 * | 9/2023 | Wiesner | B23D 61/185 |

FOREIGN PATENT DOCUMENTS

| | | |
|---|---|---|
| TW | 353781 B | 3/1999 |
| TW | 201421562 A | 6/2014 |
| TW | 201946753 A | 12/2019 |
| TW | 202015841 A | 5/2020 |
| WO | WO 2013079683 A1 | 6/2013 |

\* cited by examiner

METHOD FOR SEPARATING A PLURALITY OF SLICES FROM WORKPIECES BY MEANS OF A WIRE SAW DURING A SEQUENCE OF SEPARATION PROCESSES

CROSS REFERENCE TO RELATED APPLICATIONS

This application is a U.S. National Phase application under 35 U.S.C. § 371 of International Application No. PCT/EP2021/063443, filed on May 20, 2021, and claims benefit to European Patent Application No. EP 20179150.6, filed on Jun. 10, 2020. The International Application was published in German on Dec. 16, 2021 as WO 2021/249735 A1 under PCT Article 21(2).

FIELD

The present disclosure relates to a method for cutting a multiplicity of slices by means of a wire saw from workpieces during a sequence of cut-off operations.

BACKGROUND

A method for cutting a multiplicity of slices can be accomplished by means of lap slicing or grind slicing.

In the case of lap slicing, working fluid in the form of a slurry consisting of hard materials in a liquid carrier medium is fed to the working space formed between the wire surface and the workpiece. In the case of lap slicing, material is removed by means of a three-body interaction involving the tool carrier (saw wire), the tool (abrasive) and the workpiece.

In the case of grind slicing, use is made of saw wire in whose surface hard materials are firmly bonded, and a working fluid is supplied which itself contains no abrasive materials and acts as a cooling lubricant. In the case of grind slicing, material is removed by means of two body interaction involving a diamond-coated saw wire as a tool and the workpiece.

In the case of conventional wire saws, each of the wire guide rollers is provided in the vicinity of each of its end faces with a bearing which is connected in a fixed manner to the machine frame and is referred to as a fixed bearing, and is provided in the vicinity of the opposite end face with a bearing which is movable in the axial direction of the wire guide roller relative to the machine frame and is referred to as a floating bearing.

The wire guide rollers of the wire array usually consist of a core made of metal, which is usually enclosed with a shell, made of polyurethane for example. The shell has a multiplicity of grooves, which serve to guide the saw wire that forms the wire array of the wire saw. The shell is typically secured on the core of the respective wire guide roller of the wire array in such a way that it can expand or contract axially unhindered at both ends when there is a change in temperature. This notwithstanding, the shell may be fixed on one side or on both sides of the wire guide roller by one or two clamping rings, respectively.

There are measures which aim to counteract the change in the arrangement of the wire array and the workpiece relative to one another during the cut-off operation in order to improve the plane parallelism of the main surfaces of the slices to be cut off.

US 2002/0 174 861 A1 describes a method which envisages control of the temperature of the workpiece in order to limit the warp of slices that are cut off.

In US 2015/0 158 203 A1, there is a proposal to selectively induce a change in length of the shell by a temperature change in the core of the wire guide roller in order to improve the flatness of cut-off slices.

US 2012/0 240 915 A1 describes a method that provides independent cooling of the wire guide rollers and their fixed bearings to reduce relative axial movement of the wire sections and the workpiece caused by temperature changes.

U.S. Pat. No. 5,377,568 discloses a method in which the position of a reference surface situated on the outside of the wire guide roller relative to the machine frame is measured, and a thermal length increase or length decrease in the wire guide roller is brought about by adjusting the temperature of the wire guide roller interior until the measured position change of the reference surface has been compensated again.

WO 2013/079683 A1 discloses a method in which, first of all, the slice shapes obtained at various temperatures of the wire guide roller bearings are measured, and each of these shapes is stored with the respectively associated bearing temperature, and, in the follow-on cut, the bearing temperature which best matches the desired target shape is then selected.

U.S. Pat. No. 5,875,770 discloses a method in which the shape of slices from a cut is measured, a cut depth-dependent correction curve is calculated by forming the difference with respect to a desired ideal shape of the slices, and, in the following cut, the workpiece is moved in the axial direction relative to the wire array in accordance with this correction curve during the cut-off operation.

Despite these measures, the present inventors have recognized that there continues to be a need for improvements, on the one hand because these measures have only a limited effect and, on the other hand, because the requirements in respect of flatness and plane parallelism of slices are becoming ever more demanding, especially in the semiconductor industry.

SUMMARY

In an embodiment, the present disclosure provides a method that cuts a multiplicity of slices, using a wire saw, from workpieces during a sequence of cut-off operations divided into initial cuts and follow-on cuts. The wire saw has a wire array of moving wire sections of a saw wire and an actuating device. The wire array is tensioned in a plane between two wire guide rollers, each of the two wire guide rollers: being supported between a fixed bearing and a floating bearing, and comprising at least one chamber and a shell which encloses a core of the respective one of the wire guide rollers and which is structured with guide grooves for the wire sections. The method includes: during each of the cut-off operations, feeding a respective workpiece, of the workpieces, with the actuating device, through the wire array along a feed direction perpendicular to a workpiece axis and perpendicular to the plane of the wire array in a presence of a working fluid and hard materials, which act abrasively on the workpiece, the feeding of the workpiece through the wire array further comprising: during each of the cut-off operations, feeding the workpiece through the wire array while simultaneously changing a length of the shell of each of the two wire guide rollers by adjusting a temperature of the chamber of each of the wire guide rollers with a first cooling fluid in accordance with a specification of a first temperature profile, which specifies a temperature of the first cooling fluid in dependence on a depth of cut and which correlates with a first correction profile, which specifies a change in a length of the shell of each of the two wire guide rollers in dependence on the depth of cut; and during each of the cut-off operations, feeding the workpiece through the wire array while simultaneously moving the workpiece along the workpiece axis in accordance with a specification of a second correction profile, which specifies a travel of the workpiece, the first correction profile and the second correction profile being opposed to a shape deviation; and determining the shape deviation before each of the cut-off operations by comparing an average shape profile of already cut-off slices with a reference shape profile.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
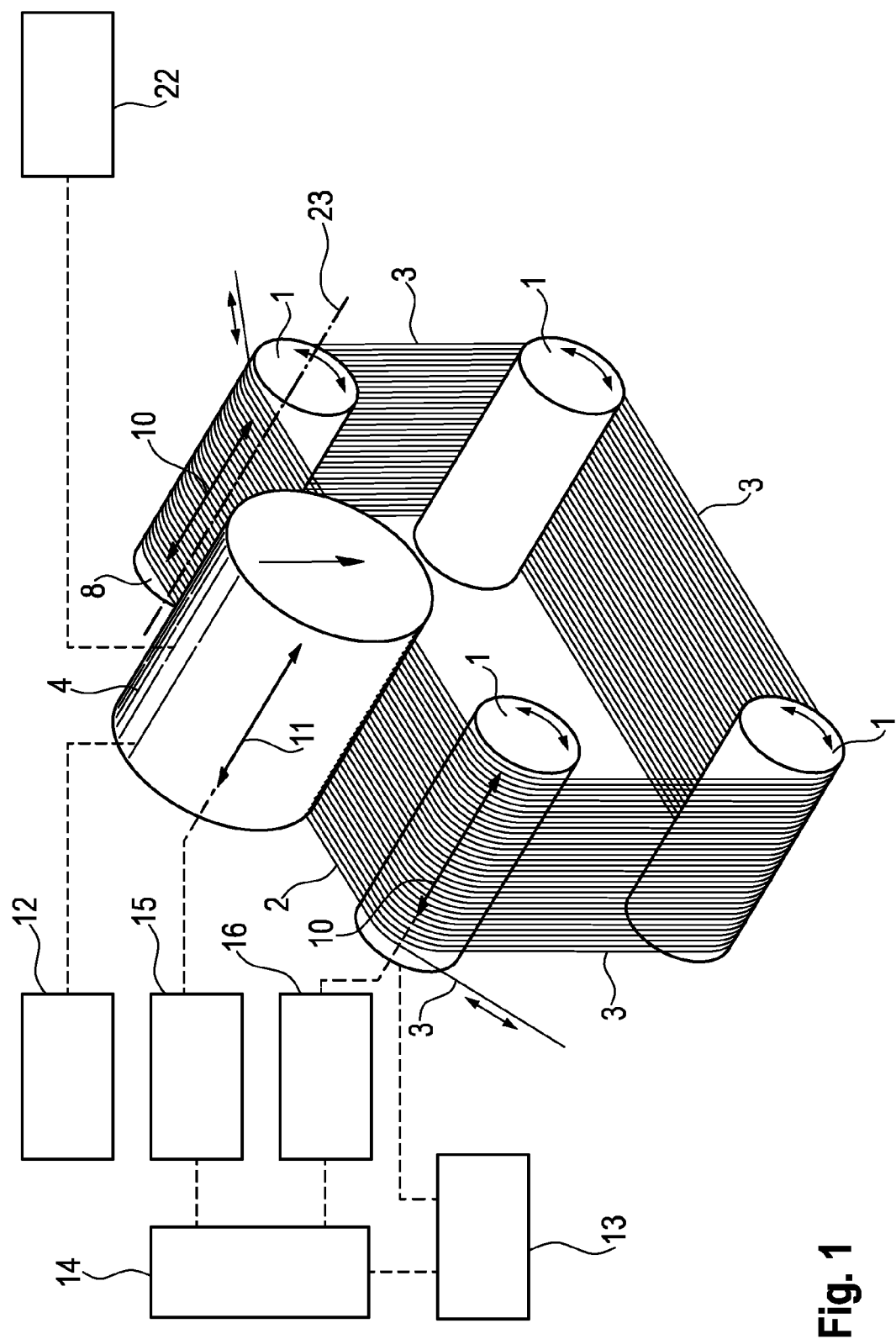
FIG. 1 shows schematically features of a wire saw that play a role in the use of aspects of the present disclosure.

The present disclosure relates to a method for cutting a multiplicity of slices by means of a wire saw from workpieces during a sequence of cut-off operations, wherein the wire saw comprises a wire array of moving wire sections of a saw wire and an actuating device, and the wire array is tensioned in a plane between two wire guide rollers, and wherein each of the two wire guide rollers is supported between a fixed bearing and a floating bearing and comprises at least one chamber and a shell which encloses a core of the wire guide roller and which is structured with guide grooves for the wire sections. During each of the cut-off operations, the respective workpiece is fed by means of the actuating device through the wire array along a feed direction perpendicular to a workpiece axis and perpendicular to the plane of the wire array in the presence of a working fluid and hard materials, which act abrasively on the workpiece.

Aspects of the present disclosure make available slices whose shape matches a target shape as closely as possible.

An aspect of the present disclosure provides a method for cutting a multiplicity of slices by means of a wire saw from workpieces during a sequence of cut-off operations divided into initial cuts and follow-on cuts, wherein the wire saw comprises a wire array of moving wire sections of a saw wire and an actuating device, and the wire array is tensioned in a plane between two wire guide rollers, wherein each of the two wire guide rollers is supported between a fixed bearing and a floating bearing and comprises at least one chamber and a shell which encloses a core of the wire guide roller and which is structured with guide grooves for the wire sections, the method comprising during each of the cut-off operations, feeding the respective workpiece by means of the actuating device through the wire array along a feed direction perpendicular to a workpiece axis and perpendicular to the plane of the wire array in the presence of a working fluid and hard materials, which act abrasively on the workpiece, which comprises during each of the cut-off operations, feeding the workpiece through the wire array while simultaneously changing the length of the shells of the two wire guide rollers by adjusting the temperature of the chambers of the wire guide rollers with a first cooling fluid in accordance with the specification of a first temperature profile, which specifies the temperature of the first cooling fluid in dependence on a depth of cut and which correlates with a first correction profile, which specifies the change in the length of the shells in dependence on the depth of cut;

during each of the cut-off operations, feeding the workpiece through the wire array while simultaneously moving the workpiece along the workpiece axis by means of an actuating element in accordance with the specification of a second correction profile, which specifies the travel of the workpiece, wherein the first and second correction profiles are opposed to a shape deviation; and determining the shape deviation before each of the cut-off operations.

The method can be configured as lap slicing or grind slicing. Depth of cut (doc) denotes a length counter to the feed direction in the region of the entry cut into the workpiece as far as the exit cut from the workpiece.

Changing the axial length of the shells and of the wire guide rollers of the wire guide rollers tensioning the wire array by adjusting the temperature of the chambers of the wire guide rollers (referred to below as wire guide heat control, WGHC) can be implemented in the manner proposed in US 2015/0 158 203 A1, for example. Moreover, a first cooling fluid, with which the temperatures of the chambers of the wire guide rollers are adjusted, is passed through the chamber of the respective wire guide roller in accordance with the specification of the first temperature profile, which specifies the temperature of the first cooling fluid in dependence on a depth of cut. The first temperature profile correlates with a first correction profile, which specifies the change in the length of the respective shell of the wire guide rollers in dependence on the depth of cut. In advance, it is experimentally determined what temperature change of the first coolant is required to bring about the specified change in the length of the shell of the respective wire guide roller. The first correction profile is opposed to a shape deviation determined before each of the cut-off operations.

It is possible to provide more than one chamber in the core of a wire guide roller and to supply cooling fluid to each of the chambers independently, the temperature of which in each case follows its own temperature profile. In this case, these temperature profiles together bring about the change in the length of the shell of the respective wire guide roller required by the first correction profile.

Feeding the workpiece through the wire array while simultaneously moving the workpiece along the workpiece axis by means of an actuating element in accordance with the specification of a second correction profile (referred to below as IPC, ingot positioning control) is employed together with WGHC during each of the cut-off operations. The actuating element is preferably a piezoelectric actuator.

The second correction profile is likewise opposed to the shape deviation determined before each of the cut-off operations.

The depth-of-cut-dependent change in the length of the shell of the wire guide roller by means of WGHC and the depth-of-cut-dependent movement of the workpiece in the direction of the longitudinal axis thereof (workpiece axis) takes place relative to a common reference system, e.g. the machine frame, and thus relative to the wire guide roller or wire array.

The first and second correction profiles together form an overall correction profile that minimizes shape deviation.

Adjusting the temperature of the fixed bearing (hereinafter referred to as WGTC, wire guide temperature control) causes a change in the position of the wire guide roller and thus of the wire array relative to the position of the workpiece (rod, ingot) because this causes the floating bearing and the wire guide roller to be moved in the direction of the axis of rotation of the wire guide roller relative to the common reference system.

According to a preferred embodiment of the present disclosure, WGHC and IPC are employed in combination with WGTC. In this case, the overall correction profile comprises a third depth-of-cut-dependent correction profile, namely the profile which specifies the travel of the floating bearings and hence that of the wire guide rollers of the wire array by means of WGTC.

There are particular advantages associated with the combination of WGHC and IPC or of WGHC, IPC and WGTC. If WGHC and IPC or WGHC, IPC and WGTC are used in combination, it is possible to achieve an amplitude (amount of travel) of movement of the wire guide rollers relative to the workpiece that is greater than the amplitude possible when using only one of the measures. The range within which the movement of the floating bearings and the workpiece is linearly dependent on the variable bringing about the movement is wider than the corresponding range available when using only one of the measures. From changing the variable that brings about the movement to the actual occurrence of the movement takes significantly more response time in the case of WGHC or WGHC and WGTC than in the case of IPC, especially if the actuating element is a piezoelectric actuator. The WGHC and WGTC measures, on the one hand, and the IPC measure, on the other hand, thus have different control bandwidths. Accordingly, it is advantageous to counter comparatively high-frequency shape deviations, i.e. shape deviations that change with comparatively large gradients depending on the depth of cut, by means of IPC and comparatively low-frequency shape deviations by means of WGHC or WGHC and WGTC.

As one embodiment, the present disclosure preferably provides a method which uses a first temperature profile, which specifies the temperature of the first cooling fluid in dependence on a depth of cut and which correlates with a first correction profile, which specifies the change in the length of the shells of the wire guide rollers in dependence on the depth of cut (WGHC); which uses a second correction profile, which specifies the travel of the workpiece (IPC); and which uses a second temperature profile, which specifies the temperature of a second cooling fluid in dependence on a depth of cut and which correlates with a third correction profile, which specifies a movement of the floating bearing of the wire guide roller and hence of the wire guide roller itself in the direction of the axis of rotation thereof (WGTC).

Adjusting the temperature of the wire guide rollers by means of WGHC (change in length of the wire guide roller and of the shell of the wire guide roller) and of the fixed bearings by means of WGTC (change in the axial position of the wire guide roller) and moving the workpiece by means of IPC cause both a relative movement of the positions of the workpiece and wire guide rollers and—by means of the change in length of the wire guide roller (WGHC)—of the position of individual wire sections of the wire array relative to the workpiece. There are therefore particular advantages associated with this embodiment. Deviations of the shapes of the slices obtained by the cut-off operation from an ideal shape, which are different for different positions of the slices in the workpiece and would thus require different movements of the relative position of the wire section and the workpiece depending on the position to ensure that all slices come as close as possible to the ideal shape, are compensated to a large extent.

The shape deviation is determined before a cut-off operation and refers to the deviation of a shape profile of a slice or an average shape profile of slices from a reference shape profile.

The determination of the shape deviation is preferably based on a comparison of an average shape profile of already cut-off slices with a reference shape profile. This comparison provides the overall correction profile which, even before a cut-off operation, determines what change in length of the shell of the wire guide roller (by means of WGHC) and what travel of the workpiece (by means of IPC) and, where applicable, of the wire guide roller (by means of WGTC) is necessary in dependence on the depth of cut in order to avoid this shape deviation which would be expected without these countermeasures. The overall correction profile is divided into the first and second correction profiles and, where applicable, the third correction profile, and this determines what proportions of change in length or travel are to be performed by means of WGHC and IPC and, where applicable, WGTC. The proportions can be divided equally or differently.

The surface of a slice is composed of the main surfaces and the edge surface. The main surfaces comprise the front side and the rear side of the slice. A slice can be measured by being arranged between a pair of sensors, as is customary in the case of warp measurement. Each of the sensors measures the distance of the facing main surface of the slice at measurement points. The measurement points can be distributed over the main surfaces or can lie along a diameter of the slice. The measurement points preferably lie with position i along the diameter of the slice, to be specific counter to the feed direction, and therefore each measurement point is associated with a particular depth of cut. The density of the measurement points is preferably no less than 1 per cm, and the distance between one measurement point and the nearest adjacent point is preferably the same for all the measurement points.

The shape profile of a slice is the line which connects the measurement points si, which are calculated at the positions i in accordance with the rule $si=\frac{1}{2}[D-(FDi-BDi)]$, where D is the distance between the sensors, FDi is the distance between the upper sensor and the respective measurement point on the front side of the slice, and BDi is the distance between the lower sensor and the respective measurement point on the rear side of the slice. It should be noted that aspects of the present disclosure can also be carried out using an alternative definition of the shape profile, as long as this alternative definition encodes the shape of the slice in dependence on the depth of cut.

An average shape profile of slices is a shape profile obtained by averaging the shape profiles of a plurality of slices. A reference shape profile is a desired shape profile, preferably the shape profile of a slice which has completely flat and mutually parallel main surfaces. The average shape profile is determined for slices which result from preferably 1 to 5 cut-off operations by means of the same wire saw, wherein these cut-off operations have immediately preceded the cut-off operation to be carried out by this wire saw. The selection of slices for the creation of the average shape profile can be slice-based or cut-based, or can include both. In the case of slice-based selection, certain slices from a cut-off operation are used to determine the respective average shape profile by averaging, and others are excluded. For example, only those slices are taken into account in the averaging process that have a specific position in the workpiece, e.g. only every 15th to 25th slice along the workpiece axis. Another possibility for slice-based selection is the exclusion of slices with the largest and the smallest deviation of the shape profile from the average shape profile of all slices in the cut-off operation (so-called trimmed mean). Alternatively, it is possible to exclude from averaging slices whose shape profile deviates from the average shape profile of all slices in the cut-off operation by more than 1 to 2 sigma. In a cut-based selection, all slices from at least one cut-off operation are used to determine an average shape profile and all slices from at least one other cut-off operation are excluded from it.

The average shape profile of slices in a cut-off operation changes over the course of a sequence of cut-off operations. Changes are preferably used to evaluate the performance of the wire saw. They may indicate wear of the saw wire and/or the shell of the wire guide rollers or of some other component of the wire saw that is subject to wear. Preferably, therefore, a threshold for the shape deviation is defined which, when reached or exceeded, initiates maintenance activities (predictive maintenance activities) instead of a further cut-off operation. Even before such a threshold is reached, such changes can be used as an occasion to take adjustment measures to counteract a deterioration of the work result due to wear. Such adjustment measures can be, for example, changing the composition and/or temperature of the working fluid and/or changing the wire speed and/or other process-specific parameters.

Cut-off operations that take place after a change in the saw system represent a special case. Such a change in the saw system occurs, for example, when there is a change of wire guide rollers, mechanical adjustments to the wire saw, or changes in physical or chemical properties of the working fluid. The first cut-off operations after a change of the saw system, the so-called initial cuts, preferably consist of 1 to 5 cut-off operations. For initial cuts, the shape deviation is preferably determined by comparing an average shape profile of slices with the reference shape profile, wherein the average shape profile of slices produced by the same wire saw in the course of one or more initial cuts made before the saw system was changed is used.

It is furthermore preferred to provide control of the temperature of the workpiece (ingot cooling, IC) during each of the cut-off operations instead of WGTC or as a fourth measure in addition to WGHC, IPC and WGTC, more specifically control by means of a closed control loop by wetting the workpiece with a cooling medium, wherein the temperature of the workpiece forms the controlled variable and the temperature of the cooling medium forms the manipulated variable of the control loop. The reference variable of the control loop is preferably a constant temperature. The cooling medium is preferably a fluid or the working fluid used in lap slicing or grind slicing. By controlling the temperature of the workpiece, it is additionally possible to limit shape deviations of the slices caused by thermal expansion of the workpiece. The control loop may be implemented, for example, as described in US 2002/0 174 861 A1.

A wire saw used in accordance with aspects of the present disclosure comprises two or more wire guide rollers, for example three or four wire guide rollers. Adjustment of the temperature of the chambers and of the fixed bearings of the wire guide rollers can be limited to the two wire guide rollers between which the wire array is tensioned, by means of which the workpiece is fed in.

The workpiece is preferably composed of a semiconductor material such as silicon, which is in a multicrystalline or monocrystalline state. The periphery of the cross section of the workpiece is square, rectangular or circular. In the case of a workpiece of cylindrical shape, the workpiece axis extends through the center of the cylinder. The method according to an aspect of the present disclosure is suitable particularly for the production of round semiconductor wafers composed of monocrystalline silicon with a diameter of at least 200 mm, in particular at least 300 mm.

FIG. 1 shows features of a wire saw suitable for carrying out the method according to an aspect of the present disclosure. This wire saw comprises a wire array 2 consisting of moving wire sections of a saw wire 3, which is tensioned in a plane between two wire guide rollers 1. During a cut-off operation, the workpiece 4 is fed through the wire array 2 along a feed direction perpendicular to a workpiece axis and perpendicular to the plane of the wire array 2 by means of an actuating device 12. In the course of said operation, the length of the wire guide rollers 1 tensioning the wire array 2 (and hence the length of the shells 8 thereof) is changed in a direction corresponding to the direction arrows 10 in accordance with the first correction profile, and the workpiece 4 is moved in the direction of the workpiece axis corresponding to direction arrow 11 in accordance with the second correction profile. In addition, the floating bearing 6 of the respective wire guide roller (and hence the respective wire guide roller itself) can simultaneously be moved in a direction corresponding to the direction arrows 10 in accordance with the third correction profile, and/or the temperature of the workpiece 4 can be controlled by means of a closed control loop by wetting the workpiece 4 with a cooling medium, wherein the temperature of the workpiece 4 forms the controlled variable and the temperature of the cooling medium forms the manipulated variable of the control loop. The first and second correction profiles and, where applicable, the third correction profile are opposed to the shape deviation determined before each of the cut-off operations. The first, second and, where applicable, third correction profiles are stored in a data processing unit 14. First and second control units 13 and 15 for carrying out WGHC and IPC and, where applicable, a third control unit 16 for carrying out WGTC control heat exchangers for adjusting the temperature of the chambers and the actuating element for moving the workpiece 4 and, where applicable, heat exchangers for adjusting the temperature of the fixed bearings of the wire guide rollers. If the use of ingot cooling (IC) is envisaged, the wire saw further comprises a device 22 for adjusting the temperature of the workpiece 4. By means of this device 22, during each of the cut-off operations, the workpiece 4 is fed through the wire array 2 while the temperature of the workpiece 4 is controlled by means of a closed control loop by wetting the workpiece 4 with a cooling medium, wherein the temperature of the workpiece 4 forms the controlled variable and the temperature of the cooling medium forms the manipulated variable of the control loop.

Figure 2:
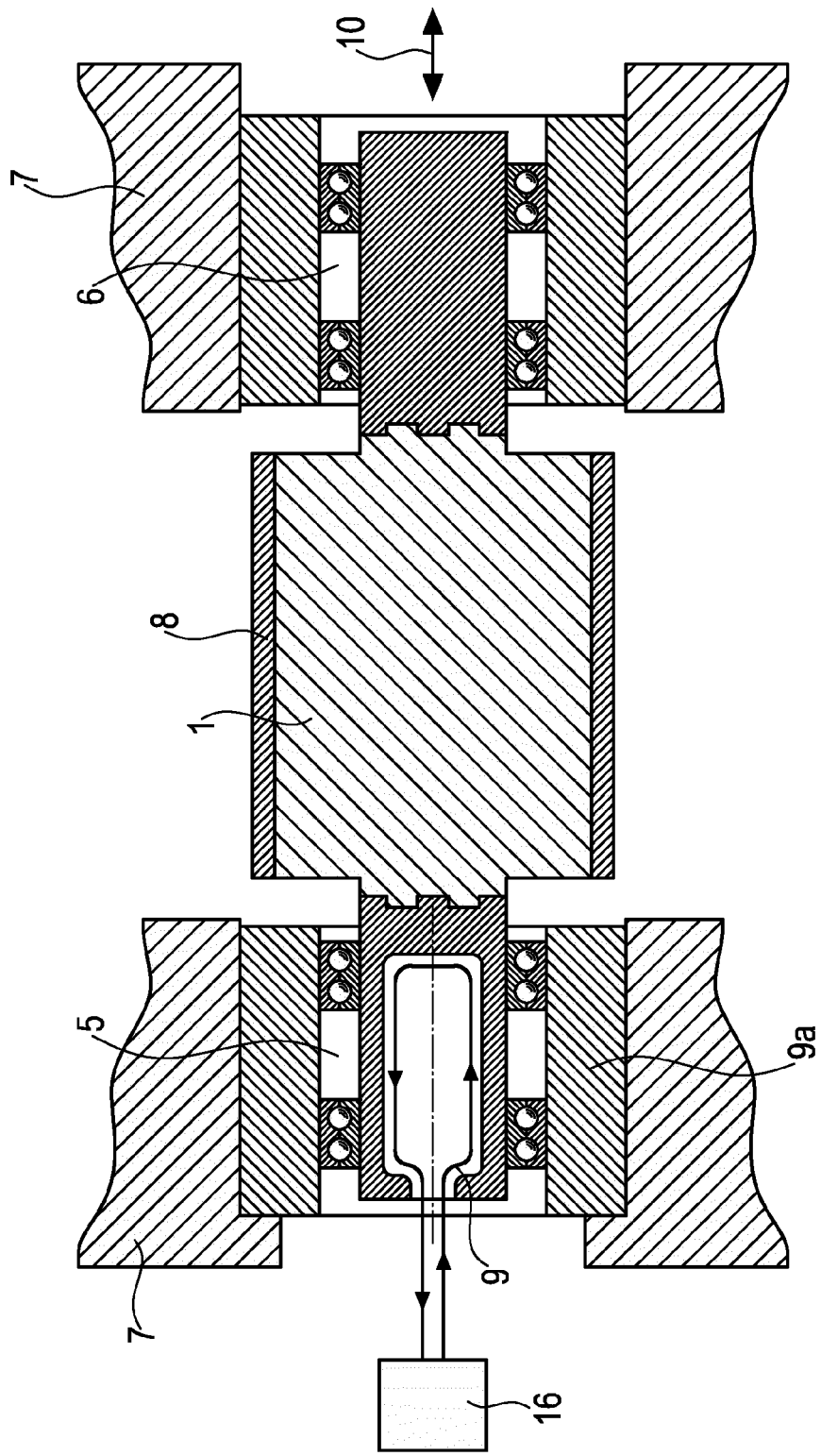
FIG. 2 shows details of the features.

As shown in FIG. 2, the wire guide roller 1 is mounted between a fixed bearing 5 and a floating bearing 6. The fixed bearing 5 and the floating bearing 6 are supported on a machine frame 7. The core 17 of the wire guide roller 1 is enclosed by a shell 8, which is provided with grooves in which the saw wire 3 runs. The fixed bearing 5 comprises a space 9 for internal temperature adjustment and/or a space 9a for external temperature adjustment, through which the second cooling fluid is passed to adjust the temperature of the fixed bearing 5'. If the temperature of the second cooling fluid is increased, the thermal expansion of the fixed bearing 5 brings about an axial movement of the wire guide roller 1 in the direction of the floating bearing 6, and the floating bearing 6 moves outward in the direction indicated by direction arrow 10 relative to the machine frame 7. If the temperature of the second cooling fluid is reduced, a movement of the wire guide roller 1 and of the floating bearing 6 in the opposite direction is brought about. The temperature of the second cooling fluid is specified in dependence on the depth of cut by the second temperature profile, which correlates with the third correction profile. A control unit 16, which is connected to a heat exchanger and a pump, ensures that the second cooling fluid passed through the fixed bearing 5 has the temperature specified by the second temperature profile when a certain depth of cut is reached. The data processing unit 14 transmits to the control unit 16 the second temperature profile, which brings about a movement of the floating bearings in accordance with the specification of the third correction profile.

Figure 3:
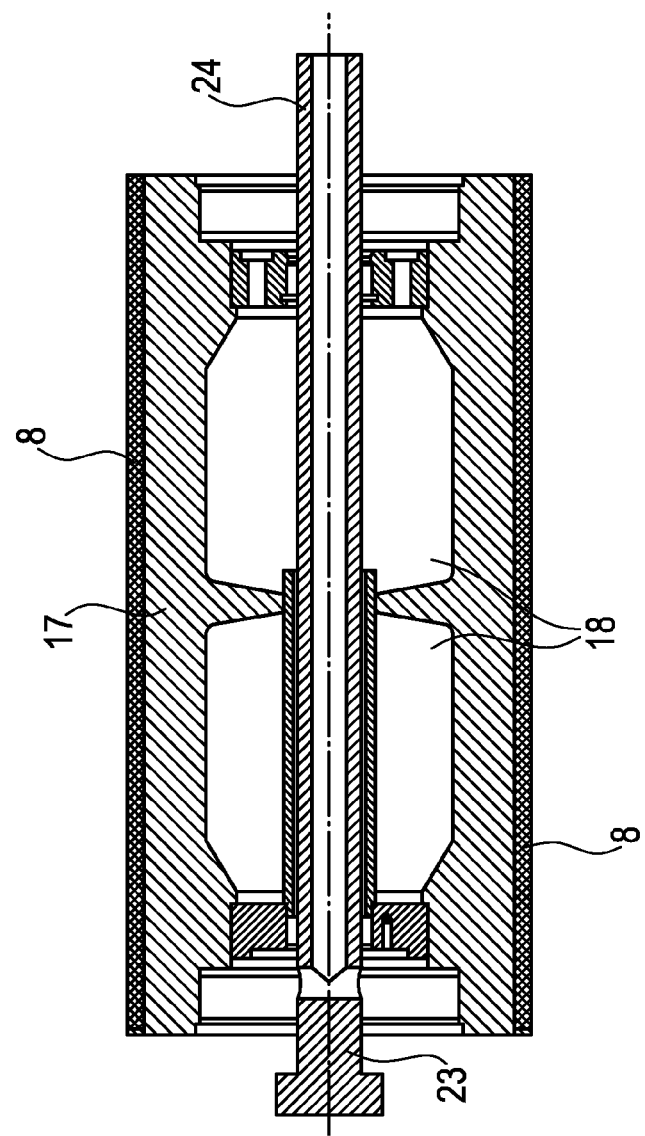
FIG. 3 shows further details of the features.

FIG. 3 shows two cavities in the core 17 of the wire guide roller, which form two chambers 18, through which the first cooling fluid is passed to adjust the temperature of the chambers 18 in order to change the length of the shell 8 of the respective wire guide roller in accordance with the specification of the first correction profile in a direction corresponding to the direction arrows 10. A bolt 24 connects the fixed bearings 5 and the floating bearings 6 coaxially.

Figure 4:
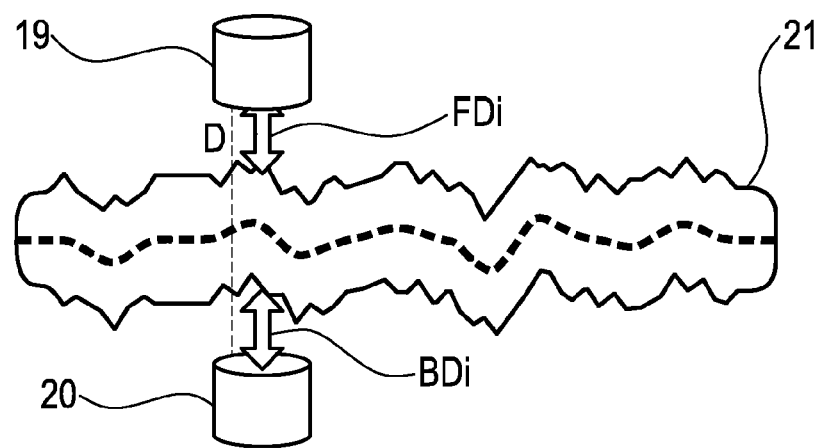
FIG. 4 shows the arrangement of a slice between two sensors for determining the shape deviation thereof before a cut-off operation.

FIG. 4 shows the arrangement of a slice 21 between two sensors 19, 20 for determining a shape deviation before a cut-off operation. The sensors 19, 20 measure the distance FDi of the upper sensor 19 from the front side of the slice 21 and the distance BDi of the lower sensor 20 from the rear side of the slice 21 at certain positions i along the diameter of the slice 21 in the feed direction in accordance with certain depths of cut. The shape profile of the slice is the line which connects the measured values si calculated in accordance with the rule $si=\frac{1}{2}[D-(FDi-BDi)]$, where D denotes the distance between the sensors. The shape deviation of the slice is obtained by comparing the shape profile of the slice with a reference shape profile. The deviation from the reference shape profile in dependence on the depth of cut corresponds to the overall correction profile, which is divided between WGHC and IPC and, where applicable, WGTC in the form of the first and the second correction profile and, where applicable, the third correction profile.

Figure 5:
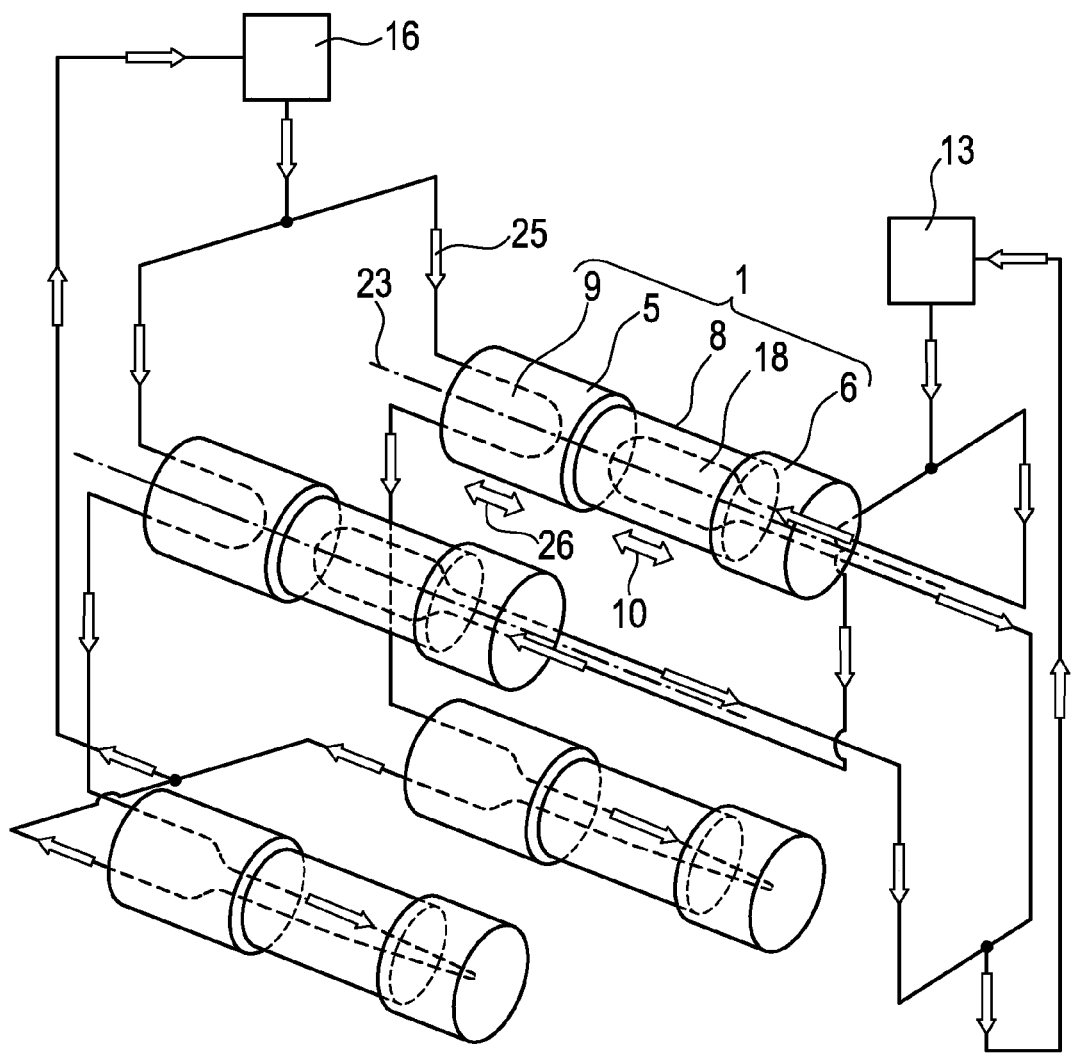
FIG. 5 shows details of features relating to a preferred exemplary embodiment with the use of WGHC and WGTC.

FIG. 5 shows details of features of a preferred exemplary embodiment with the use of WGHC and WGTC.

The control unit 13 for WGHC (change in length of the shell 8 of the wire guide roller 1 in the direction 10 parallel to its axis of rotation 23) adjusts the temperature of the first cooling fluid, which, after being distributed in parallel, first passes through the chambers 18 of the two upper wire guide rollers that span the wire array. It is then combined again and runs back into the control unit 13.

The control unit 16 for WGTC (movement of the wire guide roller 1 in the direction 26 parallel to its axis of rotation 23) adjusts the temperature of the second cooling fluid, which, after being distributed in parallel, first passes through the spaces 9 for internal temperature adjustment of the fixed bearings 5 of the two upper wire guide rollers that span the wire array. It is then used to adjust the temperature of the two lower wire guide rollers before it is combined again and returns to the control unit 16. Temperature adjustment of the lower wire guide rollers is not absolutely necessary, but serves the purpose of dissipating frictional heat generated there, for example as a result of bearing friction during rotation of the wire guide rollers. The flow direction of the first and second cooling fluids is indicated by arrows 25. The first and second cooling fluids are supplied to and removed from the rotating wire guide rollers via rotary fluid feed-throughs. Coaxial double rotary feed-throughs are used.

In the exemplary embodiment shown in FIG. 5, WGTC by means of fixed bearing internal cooling and supply and discharge of the second cooling fluid via coaxial double rotary feed-throughs is thus used. The second cooling fluid is fed in and out via a rotary feed-throughs mounted on the fixed bearing side and the first cooling fluid via a rotary feed-through mounted on the floating bearing side. The temperature adjustment circuit for WGTC passes through the upper and lower wire guide rollers, and the temperature adjustment circuit for WGHC passes through the upper wire guide rollers only.

Figure 6:
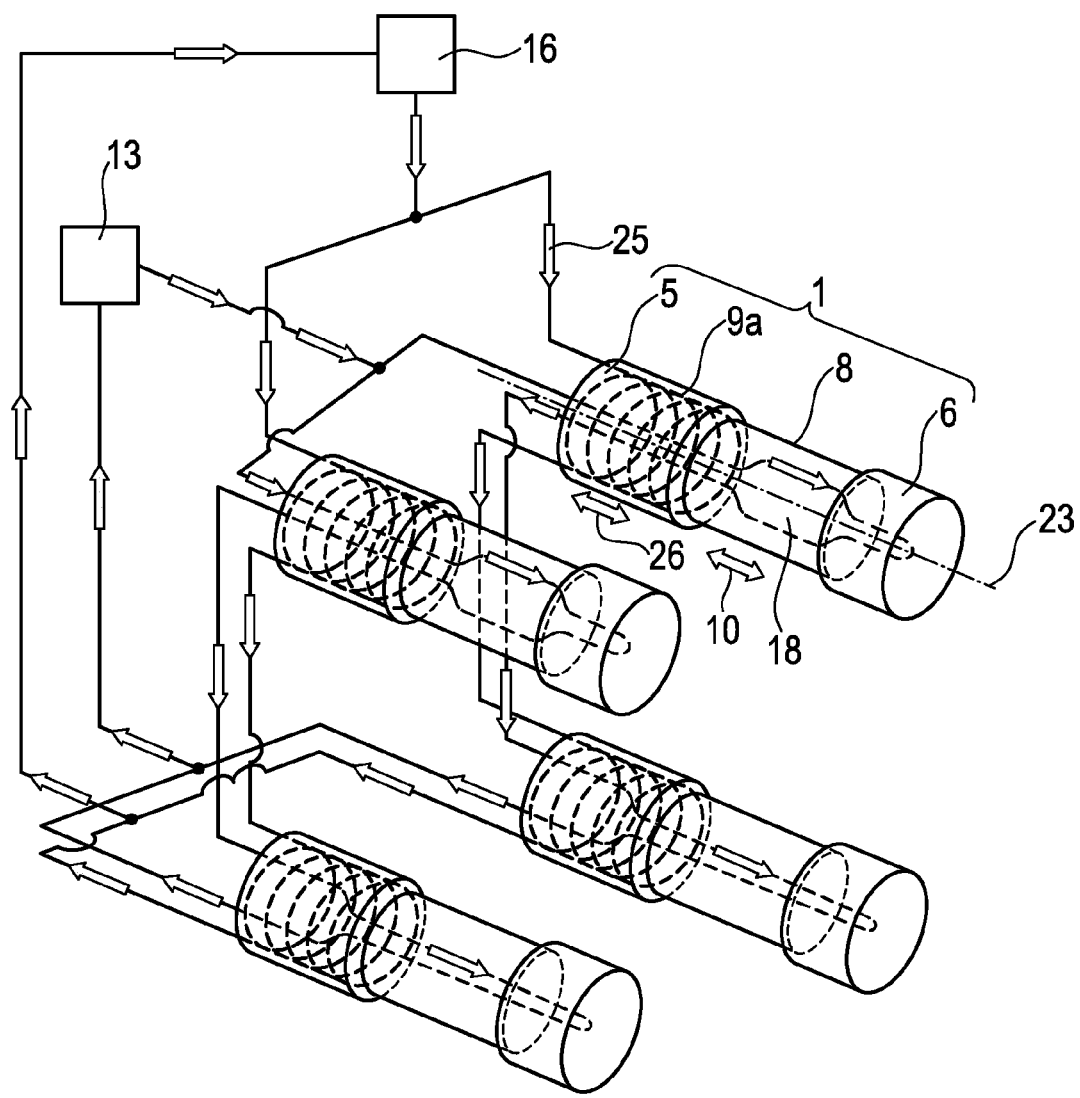
FIG. 6 shows details of features relating to a further preferred exemplary embodiment with the use of WGHC and WGTC.

FIG. 6 shows details of features of a further preferred exemplary embodiment with the use of WGHC and WGTC.

The control unit 13 for WGHC (change in length of the shell 8 of the wire guide roller 1 in the direction 10 parallel to its axis of rotation 23) adjusts the temperature of the first cooling fluid, which, after being distributed in parallel, first passes through the chambers 18 of the two upper wire guide rollers that span the wire array. It is then used to adjust the temperature of the two lower wire guide rollers before it is combined again and returns to the control unit 13.

The control unit 16 for WGTC (movement of the wire guide roller 1 in the direction 26 parallel to its axis of rotation 23) adjusts the temperature of the second cooling fluid, which, after being divided in parallel, first passes through the space 9a for external temperature adjustment of the fixed bearing 5 of the two upper wire guide rollers spanning the wire array and is then used to adjust the temperature of the two lower wire guide rollers before being combined again and returning to the control unit 16.

In the exemplary embodiment shown in FIG. 6, therefore, WGTC by means of external temperature adjustment of the fixed bearings is used. The first cooling fluid for WGHC is supplied and discharged via double rotary feed-throughs mounted on the fixed bearing side. The supply and discharge of the second cooling fluid for WGTC is carried out at the non-rotating outer fixed bearing bushings by means of fixed feed-throughs, as is the temperature adjustment of the lower wire guide rollers.

The above description of illustrative embodiments is to be understood as being exemplary. The disclosure made thereby enables a person skilled in the art, on the one hand, to understand aspects of the present disclosure and the advantages associated therewith and also comprises, on the other hand, alterations and modifications to the described structures and methods that are obvious within the understanding of a person skilled in the art.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS EMPLOYED 1 wire guide roller
2 wire array
3 saw wire
4 workpiece
5 fixed bearing
6 floating bearing
7 machine frame
8 shell
9 space for internal temperature adjustment of the fixed bearing for WGTC
9A space for external temperature adjustment of the fixed bearing for WGTC
10 direction arrow
11 direction arrow
12 actuating device
13 control unit for WGHC
14 data processing unit
15 control unit for IPC
16 control unit for WGTC
17 core
18 chambers
19 upper sensor
20 lower sensor
21 slice
22 device for adjusting the temperature of the workpiece
23 axis of rotation
24 bolt
25 flow direction
26 direction arrow

The invention claimed is:

1. A method for cutting a multiplicity of slices from a workpiece using a wire saw during a sequence of cut-off operations, which are divided into initial cuts and follow-on cuts, the wire saw comprising: a wire array of moving wire sections of a saw wire; and actuator, the wire array being tensioned in a plane between two wire guide rollers, each of the two wire guide rollers: being supported between a fixed bearing and a floating bearing, and comprising at least one chamber and a shell which encloses a core of the respective one of the wire guide rollers and which is structured with guide grooves for the wire sections, the method comprising:
before each of the cut-off operations, determining a shape deviation by comparing an average shape profile of already cut-off slices with a reference shape profile; and
during each of the cut-off operations, feeding the workpiece with the actuator, through the wire array along a feed direction perpendicular to a workpiece axis and perpendicular to the plane of the wire array in a presence of a working fluid and hard materials, which act abrasively on the workpiece, the feeding of the workpiece through the wire array further comprising:
during each of the cut-off operations, while feeding the workpiece through the wire array, simultaneously changing a length of the shell of each of the two wire guide rollers by adjusting a temperature of the chamber of each of the wire guide rollers with a first cooling fluid in accordance with a specification of a first temperature profile, which specifies a temperature of the first cooling fluid in dependence on a depth of cut and which correlates with a first correction profile, which specifies a change in a length of the shell of each of the two wire guide rollers in dependence on the depth of cut; and
during each of the cut-off operations, while feeding the workpiece through the wire array, simultaneously moving the workpiece along the workpiece axis in accordance with a specification of a second correction profile, which specifies a travel of the workpiece in dependence on the depth of cut,
wherein the first correction profile and the second correction profile are determined based on the shape deviation for counteracting the shape deviation.

2. The method as claimed in claim 1, wherein the average shape profile is determined by averaging shape profiles of selected slices, wherein the selection is slice-based, cut-based, or slice-based and cut-based.

3. The method as claimed in claim 1, wherein the already cut-off slices originate from at least 1 to 5 cut-off operations immediately preceding the respective cut-off operation.

4. The method as claimed in claim 1, which further comprises, during each of the cut-off operations, while feeding the workpiece through the wire array, simultaneously moving the floating bearing of each of the two wire guide rollers axially by adjusting a temperature of the fixed bearing of each of the wire guide rollers with a second cooling fluid in accordance with a specification of a third temperature profile, which specifies a temperature of the second cooling fluid in dependence on the depth of cut and correlates with a third correction profile, which specifies a travel of the floating bearing of each of the two wire guide rollers in dependence on the depth of cut, wherein the third correction profile is determined based on the shape deviation for counteracting the shape deviation.

5. The method as claimed in claim 1, wherein, during each of the cut-off operations, the temperature of the workpiece is controlled by a closed control loop by wetting the workpiece with a cooling medium, wherein the temperature of the workpiece forms a controlled variable and a temperature of the cooling medium forms a manipulated variable of the control loop.

6. The method as claimed in claim 5, wherein a constant temperature is specified as the reference variable of the control loop.

7. The method as claimed in claim 1, wherein:
a maintenance measure is initiated instead of the respective cut-off operation based upon determining that the shape deviation determined before the respective cut-off operation reaches or exceeds a defined threshold.

* * * * *